United States Patent [19]

Chilson

[11] 4,071,611
[45] Jan. 31, 1978

[54] CONTINUOUSLY LEACHING AN ORE COLUMN

[76] Inventor: Richard E. Chilson, 8350 Tanque Verde Road, Tucson, Ariz. 85715

[21] Appl. No.: 699,385

[22] Filed: June 24, 1976

Related U.S. Application Data

[62] Division of Ser. No. 612,941, Sept. 12, 1975, abandoned.

[51] Int. Cl.² .............................................. B01J 8/12
[52] U.S. Cl. ................................. 423/658.5; 423/41; 23/270 R
[58] Field of Search ................. 423/1, 27, 41, 45, 36, 423/658.5; 23/270, 283; 134/25 R, 36; 75/101 R, 117; 209/173, 172.5, 168

[56] References Cited

U.S. PATENT DOCUMENTS

| 1,509,686 | 9/1924 | Morterud | 423/658.5 |
| 2,783,884 | 3/1957 | Schaub | 134/25 R |
| 3,529,933 | 9/1970 | Honchar | 75/101 R |
| 3,777,003 | 12/1974 | Mitterer | 23/270 R |
| 3,883,310 | 5/1975 | Killgore | 23/283 |
| 3,885,017 | 5/1975 | Robinson et al. | 423/1 |
| 3,958,947 | 5/1976 | Robinson et al. | 23/270 R |

OTHER PUBLICATIONS

Boldt et al., The Winning of Nickel, Longmans Canada, Ltd., Toronto, (1967), pp. 294–296.

*Primary Examiner*—O. R. Vertiz
*Assistant Examiner*—Brian E. Hearn
*Attorney, Agent, or Firm*—Cahill, Sutton & Thomas

[57] ABSTRACT

A method and apparatus are described for continuously leaching ore, including the continuous addition of crushed ore to the top of a cylindrical columnar container. The ore passes downwardly through the container and is removed from the bottom of the container through a centrally disposed conduit by airlifting. A plurality of grids are spaced along the column and deflect, accelerate and turbulate the ore as it passes each of the grids. A washing liquid such as water is fed to the bottom of the column to displace leaching solutions from the ore prior to its removal from the column. Leaching reagents are continuously added through channels provided in the grids while the pregnant solution formed by the reaction of the leaching solutions to the ore is monitored through sampling intakes mounted on the grids. A deflection cone is positioned near the bottom of the column to cause the descent of the crushed ore in the column to be uniform across the width of the column.

2 Claims, 8 Drawing Figures

CONTINUOUSLY LEACHING AN ORE COLUMN

This is a division, of application Ser. No. 612,941 filed Sept. 12, 1975 now abandoned.

The present invention pertains to a method and apparatus for leaching and more particularly to the removal of soluble minerals present in the ore.

A large variety of leaching systems are known in the prior art for the recovery of valuable minerals in different types of ores. The most commonly used technique for the extraction of valuable minerals from crude ore comprises the use of vats in which crushed ore is placed and to which leaching solutions are added. Such techniques are essentially batch processing systems with their attendant inefficiency and less than satisfactory metalurgical technology. Using these vat leaching processes, the ore is usually crushed to a predetermined nominal size but the permeability of the resulting ore column or bed is significantly irregular. Attempts have been made to overcome the lack of uniformity and permeability of the ore by grinding the ore to a fine powder and forming a slurry; the slurry is subsequently leached using countercurrent leach and wash solutions. This technique is referred to as an "all sliming" system and presently appears to be the most widely accepted leaching technique, although capital and operating costs are relatively high and the pregnant solutions resulting therefrom are very dilute.

Although various other leaching systems have been proposed in the prior art in an attempt to overcome the many difficulties encountered in the all sliming process, none appear to have been practical. These prior art attempts have included countercurrent leaching using ore particles coarser than the fine powder required in the all sliming system. The prior art systems have also attempted to produce a pregnant liquid richer in the valuable mineral than is available through the use of the all sliming system. However, none of these prior art systems have presented a practical solution to the problem of obtaining valuable minerals from an ore on a continuous basis while producing a pregnant liquid rich in the desired mineral and a waste product that is clean and relatively free of harmful soluble leaching products and which may be dumped without deleteriously affecting the ecology of the geographical surrounding area.

It is therefore an object of the present invention to provide a method and apparatus for continuously leaching ore to produce pregnant liquor rich in a desired mineral.

It is also an object of the present invention to provide a method and apparatus for the recovery of a desired mineral from an ore through the use of counterflow techniques wherein the leaching solutions are effectively removed from the process waste.

It is still another object of the present invention to provide a continuous leaching method and apparatus that can efficiently recover valuable minerals from an ore through the continuous and controlled addition of leaching reagents at a plurality of locations in an ore column.

It is yet another object of the present invention to provide a method and apparatus for efficiently extracting valuable minerals from an ore using a counterflow leaching process wherein the requirements of a leaching solution may be continuously monitored at a plurality of locations in an ore column and the solution altered in accordance with such requirements.

Briefly, in accordance with the embodiment chosen for illustration, the present method and apparatus include a cylindrical container for supporting an ore column. Crushed ore is supplied to the top of the column and travels to the bottom of the column through a plurality of grids placed at spaced intervals along the column. The grids contact the crushed ore and deflect the ore causing local acceleration and turbulation to ensure uniform contact of the ore with the leaching solution and to prevent local compaction of the ore that would otherwise deleteriously affect the process. The ore moves downwardly in the column and its uniformity of motion across the section of the column is ensured through the use of a deflection cone positioned near the bottom of the column. A centrally disposed conduit is positioned co-axially within the cylindrical column and terminates at its lower end adjacent the bottom of the column. Air is injected into the conduit at the bottom end thereof to lift waste ore out of the column to the top thereof to be transported to a waste dump.

Each of the grids is provided with passages therein that open into the ore column to provide a means for supplying leaching agents to the solution in the column. The grids are also provided with passages to which are connected monitoring intakes for sampling the solution present at each intake. A rinsing solution, which may be water, is injected in the column at the bottom thereof, thus washing the ore prior to its exit from the column to ensure the recovery of valuable mineral entrapped in the leached ore pulp prior to its removal from the column.

The present invention may more readily be described by reference to the accompanying drawings in which.

Figure 1:
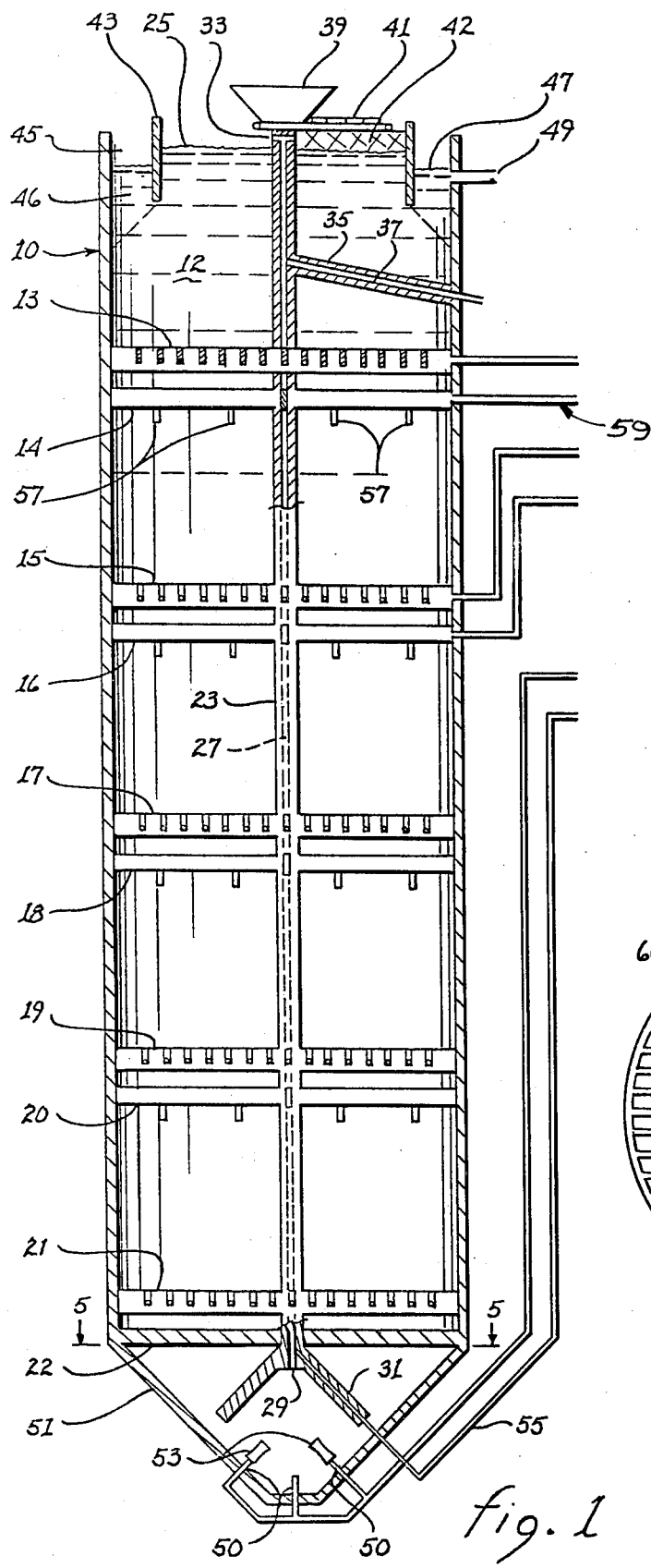
FIG. 1 is a schematic, partly in section, illustration of a cylindrical container forming an ore column incorporating the teachings of the present invention.

Referring now to FIG. 1, a cylindrical container 10 is shown for containing ore 12 in the form of a column. The cylinder 10 is provided with a plurality of pairs of grids 13–14, 15–16, 17–18, 19–20, and 21–22. A centrally disposed conduit 23 is positioned co-axially in the cylinder 10 and extends from a position near the bottom of the cylinder 10 below the grid 22 through the top of the column of ore 12. The passageway 27 within the conduit communicates at the bottom 29 thereof with the interior of the cylinder 10 below a cone-shaped deflector 31. The passageway 27 terminates at its upper end 33 above the top 25 of the ore column 12 and communicates with the atmosphere. A waste conduit 35 is joined to conduit 23 and provides a passageway 37 therein joining the passageway 27 to permit the exit of waste ore as will be explained more fully hereinafter. A hopper 39 is provided for receiving crushed ore and a conveyor system 41 is used to deliver the ore from the hopper 39 to the top 25 of the ore column 12. A plurality of baffles are schematically shown at 42 to assist in the even and unsegregated distribution of the ore over the top of the ore column.

A cylindrical wall 43 is mounted concentrically to the cylinder 10 and extends into the cylinder to the predetermined convenient depth. The wall 43, together with the cylinder 10, forms an annular space 45, free of ore, for containing a pregnant solution 46, the upper level 47 of which is above an exit conduit 49 which permits the removal of the pregnant solution for further processing.

Water jets 50 extend through the bottom 51 of the cylinder 10 into the bottom of the ore column 12 and may include a venturi portion 53. Air is injected through conduit 55 in an upwardly direction into the bottom 29 of the passageway 27. The bottom grid of each of the grid pairs, that is, grids 14, 16, 18, 20 and 22 may each be provided with a plurality of monitoring intakes such as those shown at 57. Leaching solutions are provided to the ore column 12 through the respective grid pairs through the expediency of supply lines shown generally at 59; similarly, sample leaching solutions derived through the monitoring intakes are withdrawn from the ore column 12 through conduits similar to the supply lines shown at 59.

Figure 3:
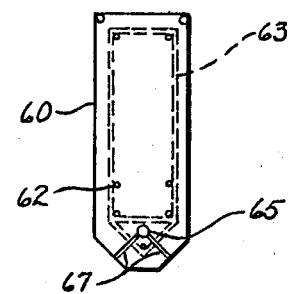
FIG. 3 is a cross-sectional view, somewhat enlarged, of an individual beam of one of the grids of FIG. 2 showing a leaching solution conduit therein.
Figure 2:
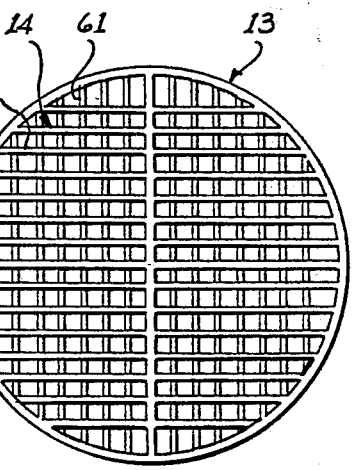
FIG. 2 is a top view of a grid as used in the apparatus of FIG. 1.

The grids and the passageways therein can be more completely described by reference to FIGS. 2, 3 and 4. The grid 13 is shown having a plurality of horizontally extending beams 60 extending transversely of the ore column. The second grid 14 of the pair 13–14 similarly includes a plurality of horizontally extending beams 61 disposed at right angles to the beams 60 of the grid 13. Leaching solutions are added to the ore column 12 through these beams of the respective grids. For example, the beam 60 of the grid 13 is shown in section in FIG. 3. Referring to FIG. 3, it may be seen that the beam is constructed of reinforced concrete having reinforcement bars 62 and 63 embedded therein. A passageway 65 positioned near the bottom of the beam 60 extends longitudinally through the beam. A plurality of passageways 67 extends from the passageway 65 to the exterior of the beam 60 to provide a communicating channel for leaching solutions in the passageway 65 to the ore passing the beam 60.

Figure 4:
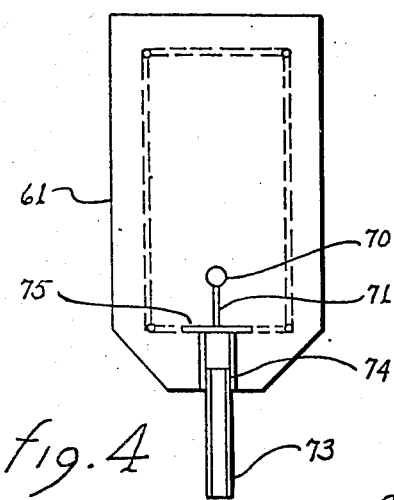
FIG. 4 is a cross-sectional view, somewhat enlarged, of an individual beam of one of the grids of FIG. 2 showing a monitoring intake.

The beam 61 of the grid 14 is shown in FIG. 4 and may be seen to be constructed in a manner similar to the beam 60. A passageway 70 extends longitudinally of the beam 61 which passageway may be connected to an appropriate vacuum source (not shown) for withdrawing the pregnant solution present in the vicinity of the beam 61 for purposes of monitoring the process. The passageway 70 is connected via a connecting passageway 71 to a sampling tube 73 threadedly engaging a pipe coupling 74 anchored in the beam 61 by means of an anchor plate 75.

Figure 5:
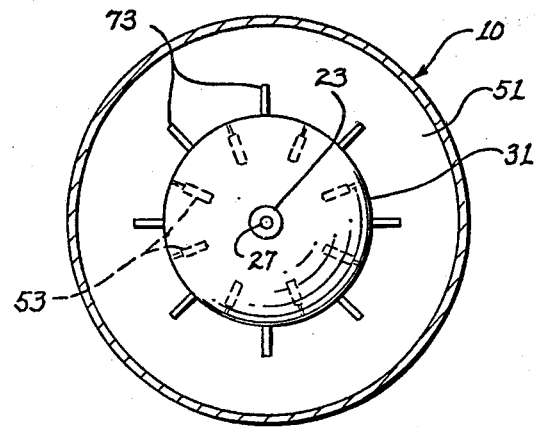
FIG. 5 is a cross-sectional view of FIG. 1 taken along line 5—5.
Figure 6:
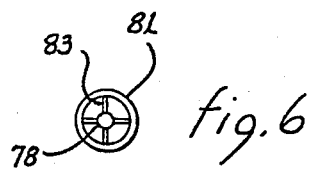
FIG. 6 is a side-elevational view, partly in section, of a venturi jet used in the apparatus of FIG. 1.
Figure 7:
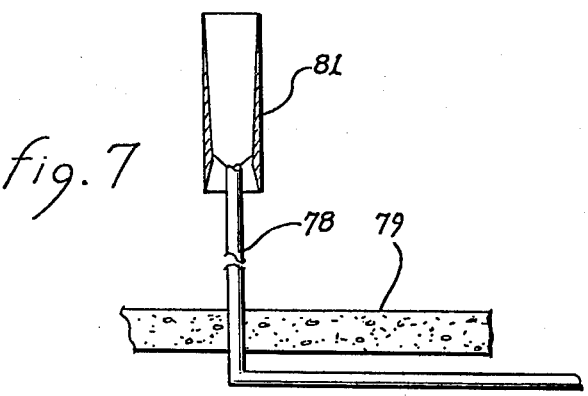
FIG. 7 is a top view of the jet of FIG. 6.

Referring now to FIG. 5, the cone-shaped deflector 31 is shown supported by a plurality of legs 73 in a position above the bottom 51 of the cylinder 10. The plurality of water venturi jets 53 are shown positioned beneath deflector 31 so that the water injected thereby mixes with the ore at the bottom of the ore column. The water venturi jets 53 may more readily be seen by reference to FIGS. 6 and 7. A water supply line 78 extends through the wall 79 of the cylinder 10 and is provided with a cylindrical venturi tube 81 at the end thereof. The tube 81 is supported by a plurality of radially extending webs 83, thereby permitting the passage of an ore slurry in the annular space between the tube 81 and the water supply line 78.

The method and apparatus of the present invention provide significant flexibility, together with a substantial improvement in efficiency over prior art leaching systems. The use of the method and apparatus of the present invention may be described, for example, in connection with the leaching of a copper ore for the recovery of metallic copper therefrom. The ore passes downwardly in the cylinder 10 while the leaching solutions travel upwardly in a counterflow environment. Assuming that the system of the present invention is to be used with an oxide ore of copper, the ore will typically be crushed to a particle size no larger than three-eighths of an inch and will be fed by a suitable conveying system (not shown) to the hopper 39. The hopper will feed the conveying system 41 which will rotate and together with the baffles 42 will uniformly distribute the ore over the top 25 of the ore column 12. The resulting substantially uniform unsegregated layer of ore thus added to the ore column 12 will be contained within the cylindrical wall 43. The ore level will be maintained above the level 47 of the pregnant solution 46 through the utilization of any convenient level indicator riding on the surface of the ore column 12.

The ore will move downwardly through the spaced pairs of grids; as the ore passes between the beams of the respective grids, the ore mass is broken up to prevent local compaction or consolidation. Since the cross-sectional area of the cylinder 10 will obviously be less at the section containing beams, the ore will be moderately accelerated and turbulated ensuring substantially complete contact of the ore with the counter-flowing leaching solutions. After the ore passes through the beams of the first grid of a pair of grids, it encounters the beams of the second grid of the pair of grids; the latter beams are disposed at a 90° angle with respect to the previously encountered beams to thoroughly stir the ore mass. As the ore passes downwardly in the cylinder 10, it successively encounters pairs of grids which repeatedly "plow" the ore mass, accelerate it, and turbulate it to prevent significant compaction or consolidation and subject the ore particles to thorough contact with the leaching solutions. Since friction will be encountered between the downwardly moving ore column and the wall of the cylindrical container 10, the central portion of the column of ore would normally descend faster than the peripheral portion; however, to prevent this differential velocity and to provide uniform movement of the ore across the width of the column, the deflector 31 imposes an opposing force to the frictional force and is inversely related thereto. The velocity of the ore across the width of the ore column is thus equalized to thereby provide an even, downward ore velocity over the cross-sectional area of the ore column.

The deflector 31 also provides a shield for the water venturi jets 53 where water or other rinsing liquid is injected in the ore mass. For example, in a copper leaching operation, the ore mass in the ore column will typically comprise 75–80% solid matter; this percentage of solid matter to fluids is changed at the bottom of the ore column by the introduction of water or other rinsing liquid through the water venturi jets 53 to reduce the solid proportion of the mass to approximately 50–60% solids. The greater proportion of fluid more effectively permits the air discharge of the waste ore as will be described below.

The ore mass having a greater percentage of fluid is located beneath the deflector 31 and is positioned at the bottom 29 of the passageway 27. Air is injected into the passageway at this position to cause ore mass to rise in the passageway 27; as the ore/water/air mixture reaches the passageway 37, the ore and water are separated and travel the passageway 37 while the air continues upwardly and exhausts through the opening 33 to the atmosphere.

As the ore in the ore column 12 moves downwardly in the cylinder 10, leaching solutions or reagents are introduced to the ore column through the passageways in each of the beams of the grids. The composition of the leaching solutions will be determined by the characteristics of the ore and the specific chemical reactions being employed for recovery of the desired mineral. The pregnant liquid being produced by the process is continuously monitored by sampling the liquid through the monitoring intakes spaced along the grid beams.

For example, if a cementation process is being used to recover copper and chalcocite is one of the significant copper minerals in the ore, the ferrous sulphate generated in the cementation process can be used at high concentrations. This ferrous sulphate occurring in the high pressure areas of the lower part of the ore column will readily be oxidized to ferric sulphate to provide an excellent solvent for chalcocite.

If the ore being processed exhibits a tendency to form ferric sulphate and no large amount of chalcocite is present in the ore, the ferric sulphate can be reduced to ferrous sulphate in the pregnant solution by the addition of sulphur dioxide through a predetermined one of the grids (preferably near the top) where the resulting sulphuric acid generated by the reduction of the ferric sulphate will be neutralized by the fresh ore being supplied to the top of the ore column.

Figure 8:
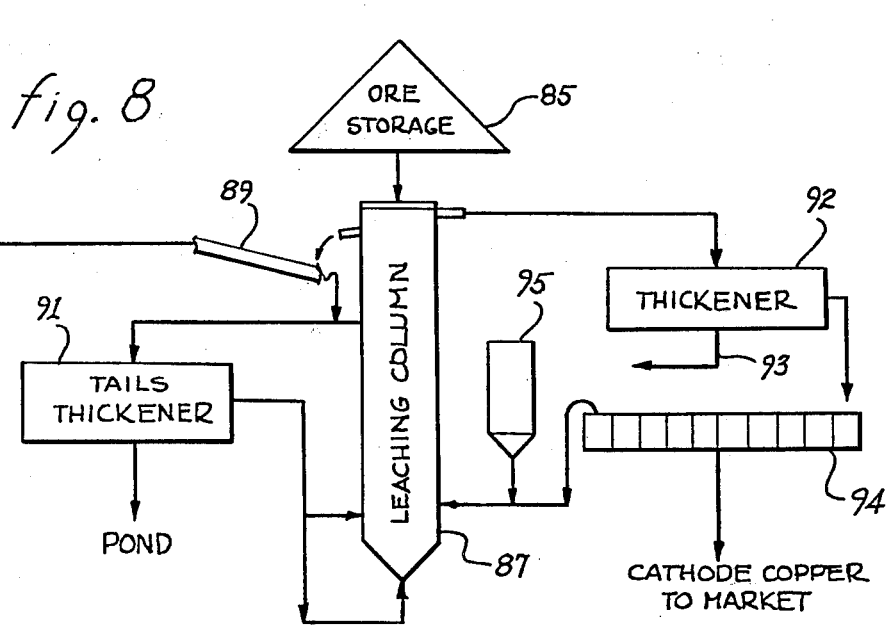
FIG. 8 is a flow diagram showing an application of the method and process of the present invention to the recovery of cathode copper.

The application of the method and apparatus of the present invention to the recovery of metallic copper from ore wherein electrowinning may be utilized may be described by reference to FIG. 8. Ore is supplied from ore storage 85 to a leaching column 87 constructed in the manner described above. The ore travels to the bottom of the column and is subsequently airlifted to be discharged to a classifier 89. Waste ore is then delivered to a dump and selected tailings are delivered to a thickener 91 and thence to a tailings pond. Liquor from the thickener 91 may be reintroduced to the column 87. The pregnant solution derived from the leaching column is supplied to a thickener 92 for clarification and is subsequently delivered to the electrolytic cells of electrowinning apparatus. The underflow from the thickener 92 is delivered through 93 to the tails thickener 91.

Generally, a copper solution strength of 40–50 gpl copper is desirable as solution for application to the electrolytic cells; however, the electrowinning apparatus will typically efficiently extract only 15–20% of the copper in the solution. The solution present after the electrowinning apparatus will thus be reduced to a strength of from 30–40 gpl of copper. Sulphuric acid is regenerated in this process and iron sulphates are oxidized to the ferric state. The solution, after electrowinning, is then recycled after the addition of acid at 95 and is enriched in copper by its passage through the leaching column. The process is continuously monitored through the use of the above-described monitoring intakes so that varying conditions existing as a result of variations in the input parameters can be accommodated. Wash water is continuously introduced into the bottommost grid pair 21–22 in a sufficient quantity to compensate for the pregnant solution being withdrawn from the column. The continuous introduction of the washing liquid or water ensures the absence of valuable mineral and leaching chemicals in the ore that is being airlifted out of the ore column.

I claim:

1. A method of continuously leaching ore comprising
   a. continuously feeding crushed ore to the top of a column of crushed ore;
   b. passing said crushed ore downwardly through a plurality of grids at predetermined spaced intervals along said column of crushed ore to turbulate said ore;
   c. continuously airlifting said ore from the bottom of said column through a centrally disposed conduit extending from adjacent the bottom of said column through said column and discharging the airlifted ore laterally from the top of said column;
   d. continuously introducing rinsing liquid upwardly into said crushed ore from near the bottom of said column;
   e. continuously introducing leaching reagents into said column of crushed ore at said spaced intervals along said column, said solutions mixing with said rinsing liquid to form leaching solutions;
   f. continuously sampling said leaching solutions at a plurality of predetermined spaced intervals along said column; and
   g. continuously withdrawing said leaching solutions from the top of said column.

2. A method of continuously leaching crushed ore comprising:
   a. continuously feeding crushed ore to the top of a column of crushed ore;
   b. passing said crushed ore downwardly through a plurality of grids at predetermined spaced intervals along said column to turbulate said ore;
   c. continuously airlifting said crushed ore from the bottom of said column through a centrally disposed conduit extending from adjacent the bottom of said column through said column and discharging the airlifted ore laterally from the top of said column;
   d. continuously introducing leaching reagents into said column of crushed ore at said spaced intervals along said column through said grids to react with said ore and form a pregnant liquor;
   e. continuously introducing rinsing liquid upwardly into said crushed ore near the bottom of said column, said rinsing liquid mixing with said pregnant liquor; and
   f. continuously withdrawing said pregnant liquor from the top of said column.

* * * * *